Patented Jan. 5, 1937

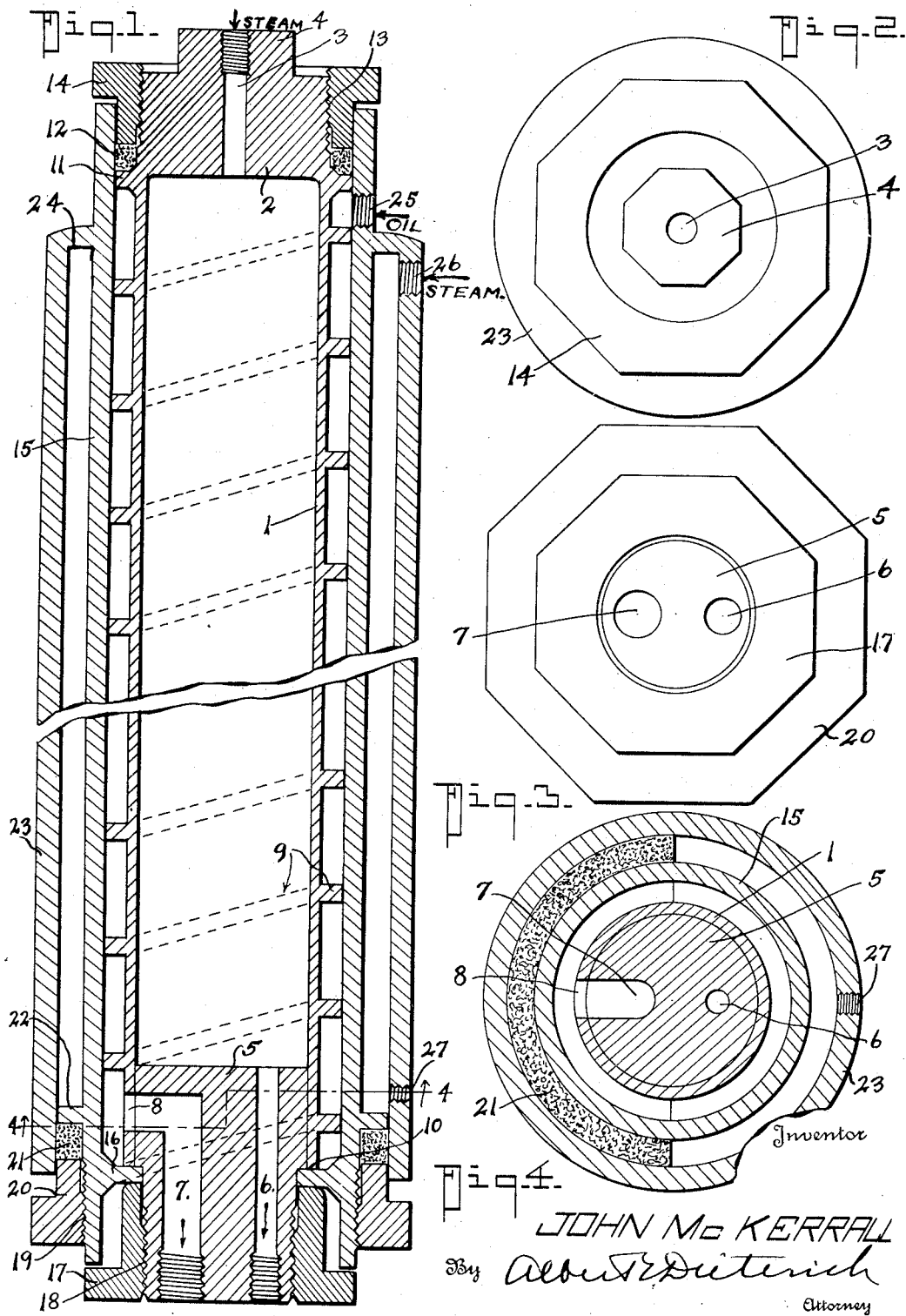

2,066,480

UNITED STATES PATENT OFFICE 2,066,480

OIL HEATER

John McKerrall, New Orleans, La.

Application August 27, 1935, Serial No. 38,138

9 Claims. (Cl. 257—243)

My invention relates to certain new and useful improvements in heating fuel oil by means of steam and it particularly has for its object to provide a fuel oil heater of a simple construction, whose parts are so designed and cooperatively arranged that the heater may readily be taken apart for cleaning and repairs.

Further it is an object to provide a fuel oil heater of such character that, without disassembling its parts, carbon deposit or scale may be loosened from the outer casing or wall and be blown out or flushed out easily.

Other objects will in part be obvious and in part be pointed out hereinafter.

To the attainment of the aforesaid objects and ends, the invention still further resides in those novel details of construction, combination and arrangement of parts, all of which will be first fully described in the following detailed description, then be pointed out in the appended claims, reference being had to the accompanying drawing, in which:

Figure 1 is a vertical longitudinal section of a heater embodying the invention.

Figure 2 is a top plan view thereof.

Figure 3 is a bottom plan view of the same.

Figure 4 is a cross section on the line 4—4 of Figure 1.

In the drawing, in which like numerals of reference indicate like parts in all of the figures, I represents the central casing of the pipe which is closed at the top by a plug 2 that is welded or otherwise permanently fastened to the pipe I. The plug 2 is provided with a steam entrance duct 3, the upper end of which may be threaded to receive a steam pipe connection (not shown) and the upper end of which is provided with a nut portion 4, the purpose of which will presently appear.

At the bottom the casing I is also closed permanently by a plug 5 that is welded or otherwise integrally secured to the casing I and is provided with a steam outlet and drain passage 6, the lower end of which may be threaded to connect with a steam takeoff pipe (not shown). The plug 5 is also provided with an oil outlet passage 7 communicating through a port 8 with the outside of the casing I. The duct 7 may have its outer end threaded to receive an oil takeoff pipe not shown.

On the outer wall of the casing I is located a spiral rib 9 that may be welded or otherwise permanently secured to the casing I, the rib 9 fitting within the intermediate or middle casing 15 to provide an oil passage between the casings I and 15 that is spiral in character.

The plug 5 is provided with a shoulder 10 against which an internal annular rib 16 on the casing 15 is held in oil-tight engagement by means of a coupling nut 17 threaded at 18 onto the plug 5.

Near the upper end the inner casing I is provided with a flange II and the upper end of the pipe or casing I is screw threaded as at 13 to receive the gland or packing nut 14, the annular space between the nut and the rib II constituting a packing chamber 12.

The middle casing 15 is provided near its lower end with an annular rib 22 that cooperates with a gland or packing nut 20 to provide a packing space 21, the nut 20 being threaded at 19 on the lower end of the casing pipe 15.

23 is the outer casing or pipe which is provided at its upper end with an internal flange 24 fitting the outside of the casing or pipe 15.

The casing 15 is provided with an oil inlet port 25 near its top and the casing 23 is provided with a steam inlet 26 at its top and a steam outlet and drain 27 near the bottom.

By the construction illustrated and described it will be observed that the casings I and 15 are rigidly secured together only at the bottom, the packing 12, gland nut 14 and rib II being so constructed as to allow for expansion and contraction of casings I and 15. The outer casing 23 is permanently secured to the middle casing 15 by welding the flange 24 to the casing 15 and the space between the casings 15 and 23 is closed at the bottom by the packing 21 in such manner as to allow for expansion and contraction of the outer casing 23.

From the foregoing, it will be seen that when steam is admitted into the inner casing I and into the outer casing 23 the oil that is passed through the space between the inner casing I and the middle casing 15 is efficiently heated since the oil must pass in a spiral direction and thus come into contact with the full area of the walls of the inner and middle casings I and 15. Should carbon begin to clog up the flow of oil it is only necessary to loosen the gland nut 17, place a wrench on the nut end 4 and rotate the inner casing I within the middle casing 15, which will cause the spiral rib 9 to scrape off the carbon from the inner wall of the middle casing 15. It may be then flushed out by the flowing stream of oil or steam may be forced through the oil duct by connecting a steam line to the oil inlet and outlet passages, if desired, in order to thoroughly clean the oil duct. If necessary the entire inner casing 1 may be removed simply by loosening up the nut 14 and removing the nut 17.

From the foregoing description, taken in connection with the accompanying drawing, it is thought the complete construction, operation and advantages of the invention will be readily understood by those skilled in the art.

What I claim is:

1. In an oil heater, three concentric tubes, plugs for the end of the central tube, said plugs having provisions to pass steam into and conduct steam from the interior of said central tube, means securing said central tube within the middle tube at one end, a packing device at the other end of said central tube to seal said central and middle tubes together so as to leave a space between said central and middle tubes for oil passage, means to admit oil to and deliver it from said oil passage, and an outer tube enclosing a steam chamber and surrounding said middle tube.

2. In an oil heater, three concentric tubes, plugs for the ends of the central tube, said plugs having provision to pass steam into and conduct steam from the interior of said central tube, means securing said central tube within the middle tube at one end, a packing device at the other end of said central tube to seal said central and middle tubes together so as to leave a space between said central and middle tubes for oil passage, means to admit oil to and deliver it from said oil passage, an outer tube enclosing a steam chamber and surrounding said middle tube, and a spiral rib on the outside of said central tube within the oil passage causing oil to flow through the oil passage in a spiral direction.

3. In an oil heater, three concentric tubes, plugs for the ends of the central tubes, said plugs having provision to pass steam into and conduct steam from the interior of said central tube, means securing said central tube within the middle tube at one end, a packing device at the other end of said central tube to seal said central and middle tubes together so as to leave a space between said central and middle tubes for oil passage, means to admit oil to and deliver it from said oil passage, the outer tube being spaced from the middle tube to provide a steam chamber, means permanently uniting said outer tube to said middle tube at the upper end and a gland packing at the lower end to close the lower end of said outer tube, and means to admit steam to and withdraw it from said steam chamber between said outer and middle tubes.

4. In an oil heater, a central hollow casing closed at its ends save for a steam admission port at one end and a steam exhaust port at the other end, a second casing having an internal rib, means to secure said central casing within said second casing to said rib with the walls of said casings spaced apart to provide an oil chamber, an expansion-packed-joint between said casings at the ends thereof remote from said rib, a spiral rib partition carried by said central casing within the space between said casings, means by which the central casing can be rotated about its axis, means to admit oil into the space between said casings at one place and deliver oil from said space at another place.

5. In an oil heater, a central hollow casing closed at its ends save for a steam admission port at one end and a steam exhaust port at the other end, a second casing having an internal rib, means to secure said central casing within said second casing to said rib with the walls of said casings spaced apart to provide an oil chamber, an expansion-packed-joint between said casings at the ends thereof remote from said rib, a spiral rib partition carried by said central casing within the space between said casings, means by which the central casing can be rotated about its axis, means to admit oil into the space between said casings at one place and deliver oil from said space at another place, and a steam jacket around said second casing.

6. In an oil heater, a central hollow casing closed at its ends, save for a steam admission port at one end and a steam exhaust port at the other end, a second casing having an internal rib, means to secure said central casing within said second casing to said rib with the walls of said casings spaced apart to provide an oil chamber, an expansion-packed-joint between said casings at the ends thereof remote from said rib, a spiral rib partition carried by said central casing within the space between said casings, means by which the central casing can be rotated about its axis, means to admit oil into the space between said casings at one place and deliver oil from said space at another place, a third casing encircling and spaced from said second casing, a flange at one end of said third casing uniting it to said second casing adjacent one end and an expansion-packed-joint between said third casing and said second casing adjacent the other end, means to admit steam into said third casing and means to deliver steam therefrom.

7. In an oil heater, three concentric pipes spaced apart, the outer pipe having a flange at its top permanently secured at one end to the middle pipe and closing the upper end of the space between said outer and middle pipes, said middle pipe being externally threaded at its lower end, a gland nut on said threaded end, an annular rib on said middle pipe and a packing cooperating with said gland nut to seal the lower end of said outer pipe, means to admit steam into and discharge it from the space between said middle and outer pipes, said inner pipe having its ends plugged, the upper plug having a steam inlet duct and a nut portion, a gland nut threaded on the upper end of said inner pipe, an annular rib adjacent the upper end of said inner pipe and a packing to cooperate with said last named gland nut to seal the upper end of said middle pipe, means to admit oil into and discharge it from the space between said inner and middle pipes, and means to secure said inner and middle pipes together as a unit.

8. In an oil heater, three concentric pipes spaced apart, the outer pipe having a flange at its top permanently secured at one end to the middle pipe and closing the upper end of the space between said outer and middle pipes, said middle pipe being externally threaded at its lower end, a gland nut on said threaded end, an annular rib on said middle pipe and a packing cooperating with said gland nut to seal the lower end of said outer pipe, means to admit steam into and discharge it from the space between said middle and outer pipes, said inner pipe having its ends plugged, the upper plug having a steam inlet duct and a nut portion, a gland nut threaded on the upper end of said inner pipe, an annular rib adjacent the upper end of said inner pipe, a packing to cooperate with said last named gland nut to seal the upper end of said middle pipe, means to admit oil into and discharge it from the space between said inner and middle pipes, means to secure said inner and middle pipes together as a unit, and means by which carbon may be loosened from the inner wall of said middle pipe.

9. In an oil heater, three concentric pipes spaced apart, the outer pipe having a flange at its top permanently secured at one end to the middle pipe and closing the upper end of the space between said outer and middle pipes, said middle pipe being externally threaded at its lower end, a gland nut on said theaded end, an annular rib on said middle pipe and a packing cooperating with said gland nut to seal the lower end of said outer pipe, means to admit steam into and discharge it from the space between said middle and outer pipes, said inner pipe having its ends plugged, the upper plug having a steam inlet duct and a nut portion, a gland nut threaded on the upper end of said inner pipe, an annular rib adjacent the upper end of said inner pipe and a packing to cooperate with said last named gland nut to seal the upper end of said middle pipe, means to admit oil into and discharge it from the space between said inner and middle pipes, means to secure said inner and middle pipes together as a unit, means by which carbon may be loosened from the inner wall of said middle pipe, said means including said nut portion and a spiral rib carried by said inner pipe on the outer surface thereof.

JOHN McKERRALL.